INVENTOR.
BERNARD J. MIDLOCK
BY
Edward H. Eames
ATTORNEY

Aug. 4, 1964     B. J. MIDLOCK     3,143,736
VEHICLE DETECTION APPARATUS
Filed Feb. 16, 1961     4 Sheets-Sheet 2

INVENTOR.
BERNARD J. MIDLOCK
BY
ATTORNEY

INVENTOR.
BERNARD J. MIDLOCK
BY
ATTORNEY

Aug. 4, 1964   B. J. MIDLOCK   3,143,736
VEHICLE DETECTION APPARATUS
Filed Feb. 16, 1961   4 Sheets-Sheet 4

*INVENTOR.*
BERNARD J. MIDLOCK
BY
Edward W. Eames
ATTORNEY

United States Patent Office 3,143,736
Patented Aug. 4, 1964

3,143,736
VEHICLE DETECTION APPARATUS
Bernard J. Midlock, Norwalk, Conn., assignor, by mesne assignments, to Laboratory for Electronics, Inc., Boston, Mass., a corporation of Delaware
Filed Feb. 16, 1961, Ser. No. 89,839
19 Claims. (Cl. 343—17.7)

This invention relates to vehicle detection apparatus particularly adapted to detection of aircraft passing a desired detection point or limited zone along an assigned path in connection with landing and take-off operations or related operations, such as at airports.

More particularly the present invention relates to an improved vehicle detector of the radar or radio reflection type for selectively detecting aircraft and other vehicles, within a certain desired range, and including a radome, the interior of which conforms generally in contour to a surface of minimum voltage points of any standing wave pattern in the projected beam and which further includes, in one aspect, in the antenna assembly, a modified supplemental antenna for providing an amplitude modulated reflected signal for remotely controlled operational test purposes, or a combination of such features.

More generally the invention relates to vehicle detection apparatus employing ultra-high frequency radio wave transmission and reception of such waves reflected from a moving object, such as an aircraft or other vehicle, passing through a beam of such waves, the reflected waves being Doppler shifted in frequency, effecting detection of such moving object.

In a principal aspect the invention relates to apparatus for detection of aircraft in flight but at a relatively low altitude and in a relatively limited zone both transverse to and along the flight path as in approaching the end of a runway for landing, for example, and enabling the position of the aircraft to be detected transverse or laterally to the desired path as well as along the path. In another aspect of the invention a modified form of the detection apparatus may be employed at one or more points along the side of a runway or the like to detect aircraft or other vehicles proceeding along the runway and also aircraft in flight but close to the ground as in landing or take-off. The invention further relates to an improved antenna assembly particularly designed for such detection apparatus and in a further preferred aspect, providing for testing of the response of the detection apparatus.

Certain aircraft traffic indicating or control systems have been proposed previously to meet the problems of growing aircraft traffic at airports, one such system being described and claimed by John L. Barker in his application Serial No. 831,586, filed August 4, 1959, under the title "Airport Traffic Indicating and Control System," which application is assigned to Eastern Industries, Incorporated, the assignee of the present application. Another such system is described and claimed by Lionel Montgomery Rodgers in his application Serial No. 85,413, filed January 27, 1961, under the title "Traffic Indicating System," and also assigned to Eastern Industries, Incorporated.

These aircraft indicating systems provide for centralized tracking of aircraft on or closely approaching an airport by operating indicator lamps, in the control tower, on a layout of the airport and vicinity, particularly along or off the end of a runway for example, to show the position of the aircraft by the latest actuated of a series of aircraft detection stations, and the present invention relates to improved detection apparatus and an improved antenna system therefor particularly adapted for use in such systems although not limited to such systems.

In the process or system of indicating, controlling and/or tracking aircraft while in part of the control area of an airport, the need arises to indicate the presence of the aircraft while it is still airborne and on its landing approach leg into the airport, as for example near the "middle marker" and at other points before the end of the runway.

Detecting the presence of an airborne aircraft on its landing approach leg into an airport or on its take-off leg leaving an airport presents certain problems since aircraft not in their landing operation or their take-off operation may fly over or through the area covered by a projected or radio detection beam, at a somewhat higher altitude than the aircraft on its landing approach leg, or take-off leg, and the aircraft to be detected does not have an exact path but has some variation both vertically and laterally from a particular desired path or an average path, which is generally in line with the center of the runway on which a landing is intended or from which take off has occurred.

In order to obtain an efficient operating indicating system, the detection system should initially detect aircraft on the landing approach leg, which is at relatively low altitudes, and ignore aircraft at substantially higher altitudes which may fly substantially over the same area covered by the projected beam of the detector.

One solution to this problem is to provide a detector with a limited range since aircraft in the traffic pattern of an airport are obliged to fly at a certain maintained given altitude, with such altitude being reduced as the aircraft "lets down" on its landing approach leg. Since other aircraft, not in the traffic pattern and yet flying over the airport are obliged to fly at an altitude substantially higher than the traffic pattern altitude, detection of aircraft in the traffic pattern, and particularly on their approach leg may be provided by a detector of limited range, as for example, a detector that may respond and detect airborne aircraft flying below about 1000 feet.

One form of detector system employing the Doppler difference between transmitted and received reflected waves to detect vehicles proceeding along a roadway is taught by John L. Barker in U.S. Patent 2,965,893, issued December 20, 1960, under the title "Vehicle Detector." Another Doppler detector device or system for detecting vehicles is manufactured and sold by Eastern Industries, Incorporated and fully described and illustrated in a publication "Manual for Electro-Matic Radar Detector Model RD-2," copyrighted 1960 by Eastern Industries, Incorporated.

Although the vehicle detector devices or systems disclosed in said U.S. Patent 2,965,893 and in the said publication are particularly adapted to their primary use in the detection of moving surface vehicles on a roadway for example, I have found that some features of these earlier detector devices and particularly of their circuitry may be employed to detect flying aircraft, with some adjustment or selection of circuit parameters to provide a somewhat higher frequency band pass, for the higher aircraft speeds, but also that a major redesign of the antenna system was needed to meet problems I found in obtaining a beam or detection zone of the desired box-like character and in obtaining the necessary increase in sensitivity for the greater range while reducing the effects of the greater exposure to weather conditions, and in directing the beam of radiated waves outward to the side and somewhat upward in one form for use alongside a runway, and in directing the beam of waves upward and diverging from a substantially vertical center-line in another form for use under the aircraft flight path, as for example in advance of or beyond the end of the runway.

Thus an important aspect of the present invention is the provision of an improved directive antenna assembly for ultra-high frequency electromagnetic waves and particularly adapted for use in Doppler detection systems for aircraft flying at low altitudes past a detection station, as well as the provision of an improved aircraft detector unit employing such improved antenna assembly.

Since it is important to assure as far as possible that aircraft detectors are operating properly, particularly in centralized indicating or tracking systems for example, as a further feature of my improved antenna system, there is provided an additional antenna element for modulating the ultra-high frequency waves in the antenna system when desired to provide a low frequency signal component simulating a Doppler beat frequency for test purposes.

As a vehicle detector for detecting moving objects such as automobiles, trucks and other surface vehicles on a roadway, both the vehicle detector of the said U.S. Patent No. 2,965,893 and the radar detector of the said publication are operable in the preferred form, from a suspended position above the roadway on which it is desired to detect moving vehicles.

Each of these prior detector devices is provided with a multiple dipole type antenna which is adjusted to project a beam of ultra high frequency radio energy of some 2455 megacycles, for example, downward toward the surface of the roadway and at a silght angle to the vertical, toward approaching vehicles for example.

Each such detector device employs the Doppler effect of the frequency shift of the wave energy reflected by moving objects so that each respective device is responsive to a Doppler heat frequency developed within the circuitry of the device within a predetermined low frequency bandpass, obtained from mixing of the ultra high frequency generated and received waves in an oscillator-detector.

The preferred form of the vehicle detector of the said U.S. Patent 2,965,893 is provided with filter networks which receive the Doppler signals derived from the oscillator-detector and pass frequencies only in a low frequency band for control of an output device. The circuitry includes an amplifier, a rectifier, a threshold amplifier and a relay, for example. The filter networks have a low frequency band pass which is substantially centered on 30 cycles per second and is some 20 cycles in width.

This preferred form finds utility in detecting moving objects substantially in the usual speed range of road traffic.

The said publication describing the radar detector discloses somewhat different circuitry than that taught by said John L. Barker in his said U.S. Patent 2,965,893. The said copyrighted publication discloses a detector device with a somewhat narrow and more peaked band-pass with a somewhat lower peak frequency. This is made possible through the use of a frequency selective feedback amplifier with regenerative characteristics, all as fully described and illustrated in the said publication.

Operating at a frequency of 2455 megacycles the radar detector described in the said publication, for example, is designed to respond to moving objects passing through the projected beam in the usual speed range of road or highway traffic.

Since certain of the detection device of the present application may be employed to selectively respond to airborne aircraft which may be traveling in a speed range of from 50 miles per hour to 200 miles per hour for example, or somewhat above road traffic speeds, these certain of the present detection apparatus are provided with a band-pass with a somewhat higher peak frequency and substantially wider than the band-pass used for detection of slower moving vehicles.

For example, a band-pass of from 80 to 120 cycles in width with a somewhat flat peak frequency range of from 60 c.p.s. to 180 c.p.s. may be used for detecting airborne aircraft with ground speeds of from 50 to 200 miles per hour and a transmitting frequency of 2455 megacycles for example.

Those detector devices employed for detecting taxiing aircraft which would travel at substantially lower speeds may have substantially the same band-pass as that of the preferred form of vehicle detector in the said U.S. Patent 2,965,893 or similar to that disclosed in the said copyrighted publication, for example, because of such reduced speeds of taxiing aircraft.

Thus, on certain of the detector devices of the present application, the value of certain filter components may be changed so as to change the band-pass, and provide a somewhat wider band pass with a higher peak frequency, as suggested above, while on certain other detector devices the preferred filter network or selective feedback feature of the respective disclosures may be used.

It will be noted, upon referring to the Barker Patent 2,965,893 that his vehicle detector is provided with a single pulse response output circuit, that is for each vehicle detected by the vehicle detector one pulse, varying in length, is provided. In contrast to the single pulse output, the radar detector, model RD-2 manufactured by Eastern Industries, Incorporated and described in the said copyrighted publication provides at least a two pulse response for each vehicle detected with provision for more than two pulses depending upon the length of time actuation of the radar detector is maintained.

Although a detector device for detecting airborne and surface traveling aircraft may be provided with circuitry similiar to the vehicle detector disclosed in the said U.S. Patent 2,965,893 and also circuitry similar to the radar detector disclosed in the said copyrighted publication, the preferred circuit form of detector device of the present invention includes circuitry generally similar to certain of the circuitry of the radar detector described in the said publication, i.e., th circuitry from the coaxial radio frequency (R.F.) transmission line to, but not including, the output section, and circuitry generally similar to certain of the circuitry of the vehicle detector disclosed in the said U.S. Patent 2,965,893, i.e., the circuitry including the threshold amplifier and the single pulse output circuit for providing a single pulse output for response above a predetermined threshold value for each detection response. A block diagram of the preferred form detector device is presented herein and described below.

Employing the composite circuitry described above as the general form of circuitry of the preferred circuit form of the detector device of the present invention, certain other modifications were performed and a new antenna assembly was provided thus providing the improved detector device of the present invention.

In order to detect aircraft in the air it was necessary to project the confined radio beam vertically upward so that aircraft flying through the projected beam might be detected.

The antenna assembly was redesigned in that the reflector was reshaped and the dipoles were arranged in a single line of four dipoles to provide a more enveloping beam pattern so as to cover more area, with the entire antenna assembly positioned so as to direct the beam vertically upward thus providing a wider beam pattern than previously obtained. With this wider and thicker beam pattern multiple detectors may be spaced in a row transverse to the flight path if desired to provide a wall of radiant energy which may be any desired length, depending upon the number of detectors employed in any one row, and as wide as the width of the projected beam.

Additional shielding of circuitry and electrical components was provided by rearrangement of the lay-out of the circuit and components of the detector device. This, along with the use of electrical components having closer tolerances, substantially reduced the electrical noise heretofore present in the detector device. With such reduction of electrical noise the signal to noise ratio was increased thus permitting increased sensitivity and therefore greater range than heretofore obtained.

As more fully described below, the present application provides an improved detector device in two forms, one form provides for detection of aircraft flying below about 1000 feet above the antenna of the detector device, as for example, aircraft in the air corridor adjacent to the end of a runway. This last mentioned form includes the form of antenna assembly mentioned above.

Another form of improved detector device includes another form of antenna assembly including two rows of four dipoles mounted on a flat reflector with the reflector mounted so as to direct an ultra-high frequency radio beam, in fan-like pattern substantially horizontally across the path of an aircraft that may be either taxiing on the ground or on landing or take-off run on or flying above, the runway. The pattern of the beam, although fan-like horizontally, also has a vertical component in that it diverges somewhat upward as it crosses the runway so as to be projected above the surface of the runway, with the vertical component extending higher above the ground the farther the beam extends from the antenna.

Thus aircraft traveling on and somewhat above the ground passing through this horizontally projected beam may be detected through the Doppler-shifted reflected signal.

Since the antenna assembly of both forms of detector device is exposed to the elements and other foreign matters, an arcuate plastic radome is fitted over the entire assembly, through which the ultra-high frequency radio beam is projected.

Although it was found satisfactory to increase the signal to noise ratio of the detector device and thus increase the range of detection so as to detect airborne aircraft at and below a desired altitude and to substantially ignore aircraft flying substantially above the limit of the range, a problem of response to natural precipitation, such as rain and snow arose, because of the high degree of sensitivity employed in operation of the detector device. Further it was found that when rain or snow fell toward and struck the antenna radome and either puddled on the radome or ran down or fell down the exterior of the radome, the dielectric constant of that portion of the radome was temporarily changed so as to vary the amplitude of the energy reflected by that portion of the radome and thus to vary the amplitude of the standing wave and provide a false response of the detector device, due to amplitude modulation of the signal reflected from the interior of the radome or amplitude modulation of the standing wave.

Provision was made to remove the arcuate radome from the detector device which was to be employed under the air corridor, having the top-mounted antenna assembly, and measure the maximum and minimum points of a standing wave formed by reflection of the transmitted wave. It was found that each consecutive minimum voltage point was part of a full irregular surface which enveloped the top of the antenna assembly and that such minimum voltage surface could be plotted so that a full surface of particular contour above the multi-dipole antenna assembly at one irregular minimum voltage level could be determined.

The specific contour of one such surface at one of the levels which would provide for and permit drainage of any water that might otherwise have a tendency to accumulate on the surface of a radome was plotted and a radome was made to conform to the measured irregular minimum voltage surface. It should be noted that the minimum voltage point referred to is the zero value between the two adjacent maximum points in the standing wave pattern.

A radome formed from a material having substantially constant thickness was provided, the interior of which substantially conformed with the plotted minimum voltage surface and yet permitted drainage or run-off of any water that could accumulate from rainfall or other source. This substantially reduced the amplitude of the standing wave since the value of the wave reflected was substantially at minimum value or zero voltage.

Since the detector device of the present application may be employed in an airport traffic surveillance system, certain of the detector devices may be located at rather remote distances from the control center, this presented a need for remote testing the individual detector devices for proper operation. Therefore I have developed and provided, in association with my antenna assembly, a supplementary antenna unit which can be controlled remotely, as for example, at the control center, for determining whether or not the detector device is transmitting a signal or otherwise operating properly.

The components of the suplemental antenna unit includes two small wires, which serve as a dipole and are individually connected to opposite sides of a diode which passes current in one direction only. By applying a low frequency alternating current (A.C.) when desired for test purposes, as for example a frequency within the band-pass of the detector device, to the supplemental dipole antenna current is passed through one wire or arm of the dipole, the diode and through the other wire or arm of the dipole on the positive excursion of the A.C. wave, and current is blocked during the negative excursion of the wave, for example, by the diode so that the supplemental dipole antenna is pulsed at the frequency of the applied A.C. The pulsing of the supplemental antenna unit changes reflection or reradiation characteristic so that some of the ultra-high frequency radio energy transmitted from the main antenna assembly of the detector device is reflected or reradiated back by the supplemental antenna, with the reflected signal amplitude modulated at the same frequency as the frequency of the A.C. applied to the supplemental antenna, thus introducing a corresponding amplitude modulated component in the received reflected waves and in the oscillator-detector.

The oscillator-detector of the detector device will respond to such amplitude modulated signal and will operate as if a moving object were passing through the projected beam of the antenna assembly and reflecting back the transmitted signal Doppler shifted in frequency and such Doppler shift is within the band-pass frequency of the detector device.

Thus through providing and repositioning a new improved antenna assembly and determining and providing a radome of specific contour to reduce the effect of a change of the dielectric constant of the radome and by providing a remotely controlled modified supplemental dipole antenna providing an amplitude modulated reflected signal within the band pass frequency for testing purposes, I have provided a useful, practical and greatly improved detector device of the radar type, responsive to a Doppler shifted reflected signal, with a desired frequency band-pass, for selectively detecting aircraft passing through a projected radio beam within a desired range.

It is therefore an object of the present invention to provide an improved detector device for selectively detecting airborne aircraft flying below a desired altitude.

Another object is to provide an improved detector device including a remotely controlled operational testing antenna.

It is also an object of the invention to provide an improved compact detection unit particularly designed for use adjacent a runway or the like in the detection of aircraft and other vehicles moving along or somewhat above the runway or the like.

It is another object of the invention to provide an improved compact antenna assembly for use in the short range detection of aircraft in low altitude flight through a short detection zone and exposed to weather conditions.

It is a further object of the invention to provide an improved antenna assembly for a Doppler radar detection apparatus and incorporating means for remote testing of its operation.

Another object is to provide an antenna assembly having a radome for a detector device operable on the Doppler principle, which radome substantially reduces the response of the detector device to temporary changes in the dielectric constant of the radome itself.

A still further object is to provide a modified supplemental antenna element adjacent the main antenna and with provision for applying a pulsating voltage to the supplemental antenna element for varying its radiation or reflection characteristic for modulation of the ultra-high frequency waves of the main antenna by reaction on the latter, such modulation being adapted for remote control for remotely determining whether or not the antenna assembly of the detector device is transmitting, or for overall test of the operation of the circuitry of the detector apparatus.

Other objects will become more apparent from a reading of the specification which describes the drawings in which:

FIG. 1 represents part of an airport or air terminal, in plan view, part of which is controlled by a local aircraft traffic indication, control or surveillance system. The surveillance system may be one of several types, such as suggested above or any other system that may employ spaced detectors along a runway or taxiway and under the air corridor adjacent to the runway.

FIG. 1 illustrates two forms in which the present detector device may be provided, with each form of the detector located in different locales in and about an airport.

The layout of the airport illustrates part of three intersecting runways E-W, which may be the east-west runway for example, N-S, which may be the north-south runway, for example and NW-SE which may be the northwest-southeast runway, for example.

For convenience of illustration part of a local aircraft traffic surveillance system is represented with the detector devices, of the present application, spaced along part of the E-W runway, located off the runway and directing a beam of ultra-high frequency radio energy across the runway, as indicated by the fan-like configuration, but also having some spread upward above the runway.

The detector devices located along the side of the runway E-W are represented by solid line circles surrounded by a broken line square. These detector devices labeled D1, D2, D3, D4 and D5 may each direct a beam of energy across the runway, which may be 150 to 250 feet wide. Further whether an aircraft be in the process of landing or taking off, in all probability when the aircraft is in the beam of detector D1 the aircraft will be airborne, either ascending or descending, thus the beam of the detector D1 is designed to have some vertical component.

Further the detector D1, as detector D10, D11 and D12 would be required to detect passage of aircraft traveling at speed ranges of from 50 to 200 miles per hour whereas detector D5, for example may detect aircraft traveling at substantially lower rates of speed.

Thus the band pass frequency of the detectors D10, D11, D12 and D1 and D2 may be wider and may be of a higher frequency than the detectors D3, D4 and D5, for example.

One form, such as detector devices D1, D2, D3, D4 and D5 may be in the form illustrated by detector device 10 where the antenna assembly is mounted in the side of a cylinder 12 and covered by a radome 11. The cylinder 12 may be used to house most of the electrical components of the circuitry of the detector device with the cylinder and antenna assembly mounted in a concrete base 13. It has been found that this form, 10, is convenient for locating a detector device along the side of a runway or taxi-way and may detect aircraft and other vehicles traveling along the surface of the runway or taxiway as well as detecting airborne aircraft on take-off or landing run such mentioned above relative to detectors D1 and D2.

Figure 7:
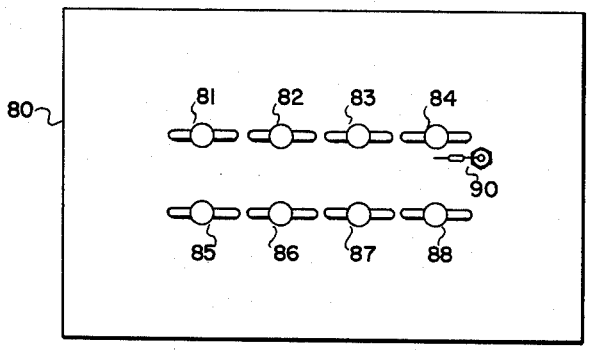
FIG. 7 is a top view, in reduced scale, of another form of antenna assembly with eight dipoles and a modified supplemental antenna.
Figure 8:
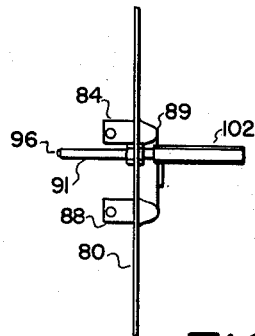
FIG. 8 is an end view (FIG. 7 turned clockwise 90 degrees) of FIG. 7 showing the relative height of the modified supplemental antenna relative to the conventional dipoles and FIG. 9 is a scale drawing of another form of modified supplemental antenna element.

This form of detector device may serve to detect passage of aircraft on and somewhat above the ground. One type of antenna assembly that may be used in the form a detector device 10 is illustrated in FIGS. 7 and 8.

Other detector devices, represented by a solid circle surrounded by a broken line circle and labeled D10, D11 and D12 are illustrated as being located off the end of the E-W runway and under the air corridor adjacent to the E-W runway.

The detector devices D10, D11 and D12 may be in a form similar to the detector device illustrated by detector device 20, where the antenna assembly is mounted on top of a housing 21 which may contain most of the electrical components of the circuitry of the detector device. A radome 22, covers the antenna assembly which antenna assembly may be similar to the antenna illustrated in FIGS. 2, 5 and 6. The housing 21 may be mounted on a pedestal of a concrete base 23 which is set in the ground.

It should be understood that although D10 represents one such detector device, the label D11 represents three such detector devices and D12 represents five such detector devices and each detector may be similar to each other.

Figure 1:
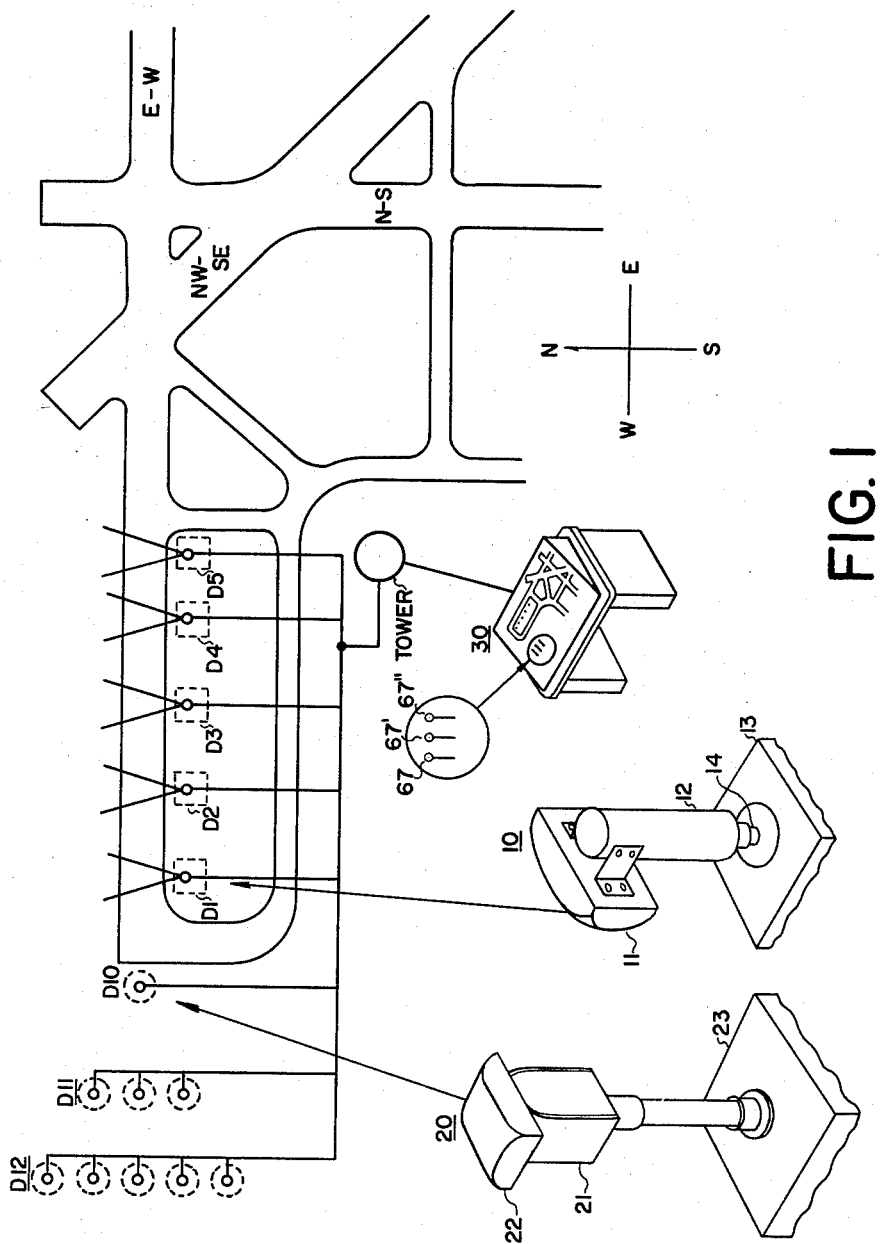
FIG. 1 is a plan view of part of airport with detector devices spaced along part of one runway and under the adjacent air corridor, with the form of packaging of the two differently located detector devices illustrated and a miniature lay-out of the airport illustrated on a table or bench.

The detector devices arranged in the form illustrated by 20 in FIG. 1 may project a beam of ultra high frequency energy vertically upward so that airborne aircraft passing through the projected beam may be detected. The detector devices D10, D11 and D12 may be used for the detection of airborne aircraft, whether in the process of landing or taking off the runway E-W, that are in the air corridor adjacent to the runway E-W. It should be noted that multiple detector devices, for example the three detector devices of D11, are arranged so that their respective projected beams interconnect to form a substantially solid wall of radiant energy substantialy three times longer than the length of the beam of one detector device.

It will be noticed that the several detector devices are electrically connected, in single line form, to the tower or control center. The single line connection is shown for convenience but it is to be understod that each detector may be individually connected by one or more wires to the tower or control center.

The tower or control center may be provided with a miniature lay-out of the airport with indicators located in the miniature lay-out at positions relative to the location of the associated detector device. The miniature layout may be on a table top or desk 30, or other work bench.

It should be noted that the detector device 10 may be mounted close to the side of a runway or taxiway and a frangible coupling 14 has been provided between the concrete base 13 and the cylinder 12 providing a device which may be knocked over with relative ease when struck by a moving object. Further the construction of the cylinder 12 and mounting for the antenna assembly and radome 11 is of crushable materials so that if the detector device is knocked over the housing will offer little resistance to impact, such as a moving wheel, for example.

It should be noted that the housing 21 and antenna assembly of detector device 20 may be mounted on a pole or other stanchion that may lift the detector device above any obstruction such as trees, for example.

Figure 3:
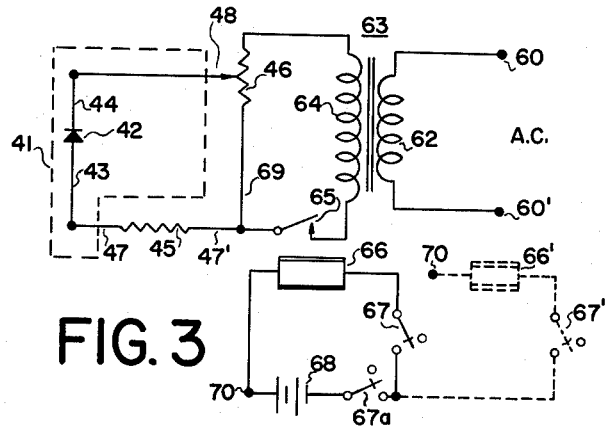
FIG. 3 is a circuit diagram of the remotely controlled modified supplemental antenna showing one method of providing modulation.

The switches 67, 67' and 67" located in the circle, represent individual switches located on the panel such as switch 67 in FIG. 3, for example, with each switch individually associated with a respective detector device.

Figure 2:
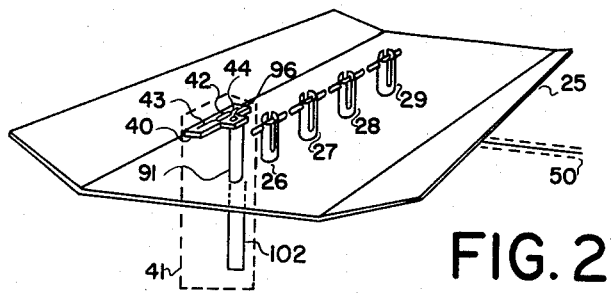
FIG. 2 illustrates one form of ultra-high frequency antenna assembly with one form of modified supplemental antenna element located thereon.

FIG. 2 illustrates one form of antenna assembly including four spaced dipoles mounted on a reflector 25. The sides of the reflector are bent upward at a low angle as indicated so as to provide a combination of four spaced dipoles and a reflector plate for providing a modified heart shaped beam pattern in the H plane, formed by two lobes diverging from opposite sides of a vertical for projecting an ultra high frequency radio beam vertically upward.

Such antenna assembly may be used as part of the detector device 20 in FIG. 1.

A plate 40 is mounted above the reflector 25 by means of rod 91 and screw 96. One form of construction of modified supplemental dipole antenna, which may include a supporting plate, 40, a diode 42, two elements of a dipole 43-44, and adjusting sleeve 102 is surrounded by a broken line box 41. The supplemental antenna illustrated in FIG. 2 in broken line box 41 is shown in schematic circuit form in FIG. 3 and in more detail construction in FIGS. 5 and 6. An alternate construction of modified supplemental dipole antenna is shown in FIGS. 7 and 8 and in detail in FIG. 9.

Referring again to FIG. 2, the diode 42 is connected between the two elements, 43 and 44 of the modified supplemental dipole antenna which may reradiate certain of the transmitted energy radiating from the antenna assembly of the dipoles 26 through 29 and the reflector 25, back to the antenna assembly.

The modified antenna 41 may include a dipole of two small arms 43 and 44 connected through a diode 42. The arms 43 and 44 may be in the form of a printed circuit, using the plate 40 as a support for the printed form or in the form of wires, as illustrated in FIGS. 2 and 6.

Certain duplications of identifying numbers will be noted in FIGS. 2, 3, 4, 5, 6, 7, 8 and 9. These duplications occur due to the fact that common components are identically labeled throughout the several drawings. Although multiple forms of construction of a modified supplemental dipole antenna element are illustrated and described, each form may substantially include the electrical circuitry disclosed in FIG. 3.

Figure 4:
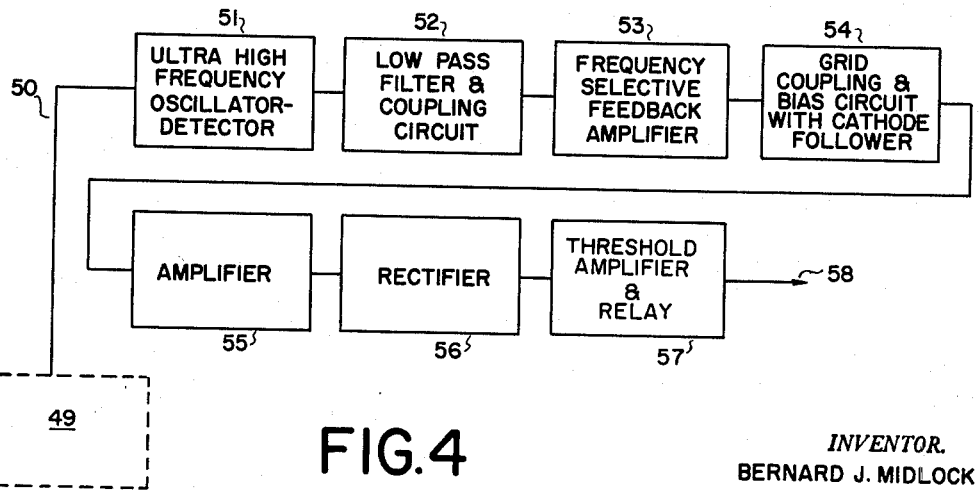
FIG. 4 is a block diagram of the preferred form of detector device.
Figure 6:
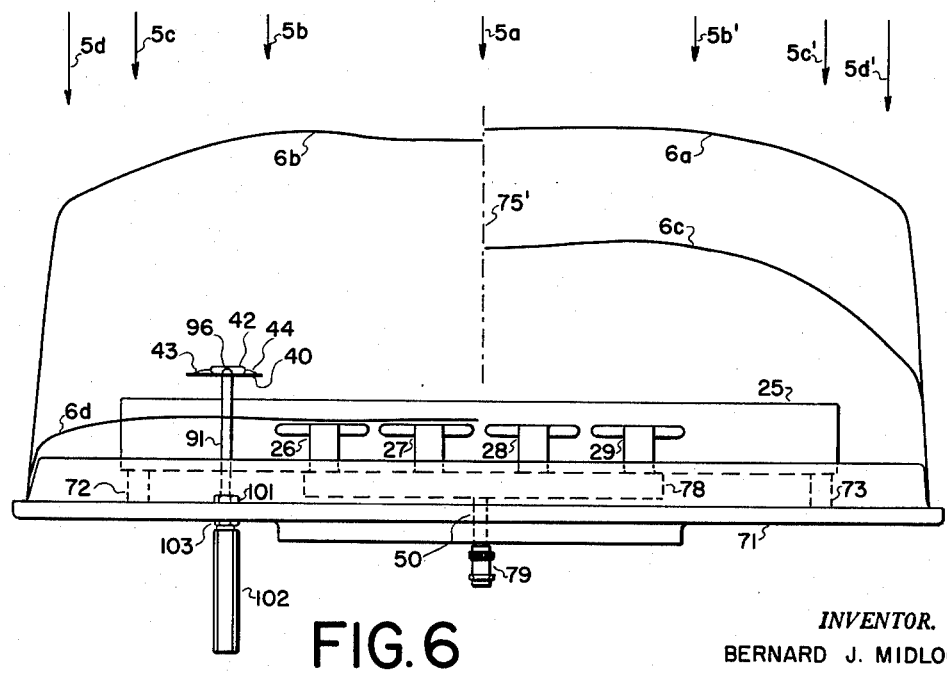
FIG. 6 is a side view, in reduced scale, of the antenna assembly in FIG. 5 with one half each of four side sectional views of the contour of the interior of the radome.

The coaxial lead 50, in FIG. 2, also illustrated in part in FIG. 6 and represented in block form in FIG. 4, is employed to carry the R.F. energy between the antenna dipoles 26 through 29 and the oscillator-detector of the circuitry of the detector device shown in block form in FIG. 4 as block 51.

FIG. 3 illustrates, in schematic circuit form, the circuit of the preferred form of remote controlled modified supplemental antenna element. The broken line block, 41 in FIG. 3 includes, in schematic circuit form, the components included in broken line block 41 in FIG. 2 and includes a diode 42 and a modified dipole 43-44. The diode 42 may be located on the top of an insulator plate 40 and may connect two wires or two printed circuit elements, such as 43 and 44 of FIG. 2, for example and thus providing a modified dipole. A resistor 45 is employed in the circuit to limit the modulation current when the gain is advanced by adjustment of the potentiometer 46. The potentiometer 46 is provided to control the amount of modulation voltage applied to the modified supplemental dipole.

Terminals 60 and 60' are connected to opposite terminals of an alternating current (A.C.) source, which may be 60 cycle, for example, or any frequency within the band-pass of the detector device. If desired a pulsed or modulated direct current source could be used in lieu of A.C.

The A.C. is illustrated as being applied across the coil 62 of transformer 63. When contact 65 of relay 66 is closed, a circuit including the secondary coil of the transformer is completed so that current induced into coil 64 may flow through the entire circuit associated with secondary coil 64.

The switch 67a represents a master switch that may be located on the panel or other convenient place, for example.

The switch 67 represents a similar switch such as one of the switches 67, 67', or 67" on the panel 30 in FIG. 1, for example and is employed to close a circuit and apply a modulating current to one of the remotely controlled modified supplemental antenna such as 41, for example, of one detector device when the master switch 67a is closed.

Assuming the master switch 67a is closed, then closure of switch 67 completes a circuit from one terminal of battery 68 through closed master switch 67a, closed switch 67, the coil of relay 66, terminal 70 to the other terminal of battery or source of power 68, to energize relay 66.

With relay 66 energized contact 65 will close and the induced A.C. will flow in the circuit including coil 64, contact 65, lead 69 and the resistor of potentiometer 46. One half of the A.C. wave will be passed by diode 42 so that for the half of the A.C. wave passed by diode 42 current will flow through the circuit including resistor 45, lead 47, arm 43, diode 42, arm 44, lead 48 and through part of the resistor of potentiometer 46, all of which is in parallel with lead 69 and the total resistance of the resistor of potentiometer 46.

Thus, for example, during the positive excursion of the A.C. wave the diode 42 may pass current from arm 43 to arm 44 so that there is current flow in the circuit including modified dipole 43-44 with the result of increasing the normal reflection, or radiation or reradiation characteristics of dipole 43-44 and during the negative excursion of the A.C. wave, the diode 42 may block passage of current so that there is no current flow across dipole 43-44 with the result of reducing back to normal, the reflection, radiation or reradiation characteristics of the modified dipole 43-44, all relative to radiation or reflection of the ultra-high frequency energy transmitted from the dipoles 26, 27, 28 and 29 of FIG. 2, for example.

When switch 67a or switch 67 or both are open so that relay 66 is deenergized and contact 65 is open there is no current flow across the dipole 43-44 from the induced A.C. in coil 64 and thus no modulation of the radiation or reflection characteristics of the modified dipole.

Another individual switch 67' and a relay 66' is illustrated in phantom form as connected between one terminal of the master switch 67a and terminal 70, representing the individual switch and relay of another circuit for applying a modulating current to another modified supplemental dipole antenna of another detector device.

With master switch 67a closed, the individual switches 67, 67' and others, if similarly connected, may be operated to individually apply a modulating current to the associated supplemental dipole antenna for individually testing the associated detector device.

Group testing may be accomplished with master switch 67a closed by ganging all the individual switches so that they may be closed in unison or by closing all the individual switches and operating the master switch 67a.

Obviously the master switch 67a, the individual switches 67, 67' etc. and/or the battery or source of power 68 may be remotely located such as switches 67, 67' etc. on panel 30, or in the tower or control center, for example.

Thus when the master switch 67a and individual switch 67 are closed, to operate the operational test circuitry, contact 65 will be closed and the induced current in coil 64 will flow through the associated circuit and the reflection or radiation characteristics of the dipole 43–44 will change or be modulated according to the frequency of the A.C. in the circuit. If a 60 cycle A.C. is induced into the circuit, modulation of the reflection characteristic will occur at a rate of 60 times a second and thus a reflected or radiated signal from the modified dipole 43–44 may be amplitude modulated at the rate of 60 times per second, for example. A pulsing direct current or an A.C. of other frequencies may be used in lieu of 60 cycle A.C. if desired. The leads 47 and 48 shown in FIG. 3, connected between resistor 45 and wire 43 and potentiometer 46 and wire 44 respectively.

The leads 47 and 48, shown in FIG. 3, connecting resistor 45 to one end of arm 43 and connecting the adjustable terminal of potentiometer 46 to one end of arm 44, respectively have been eliminated in the FIGS. 2, 5, 6, 7 and 8 for convenience and clarity although it should be understood that such leads (47 and 48) would be connected to opposite arms of the modified supplemental dipole antenna and that the remaining part of the circuitry, for providing a modulating current, also not shown in FIGS. 2, 5, 6, 7, 8 and 9 is also included for supplying and applying the modulated current across the supplemental dipole antenna of broken line block 41.

Referring to FIG. 4, a block diagram of the preferred circuitry of the detector device of the present invention is represented with the blocks 51 through 56 inclusive representing circuitry similar to that circuitry fully disclosed and described in the aforementioned copyrighted publication and the block 57 and output 58 representing a threshold amplifier circuit and relay and output similar to the comparable circuitry disclosed and described in the aforementioned issued patent.

Figure 5:
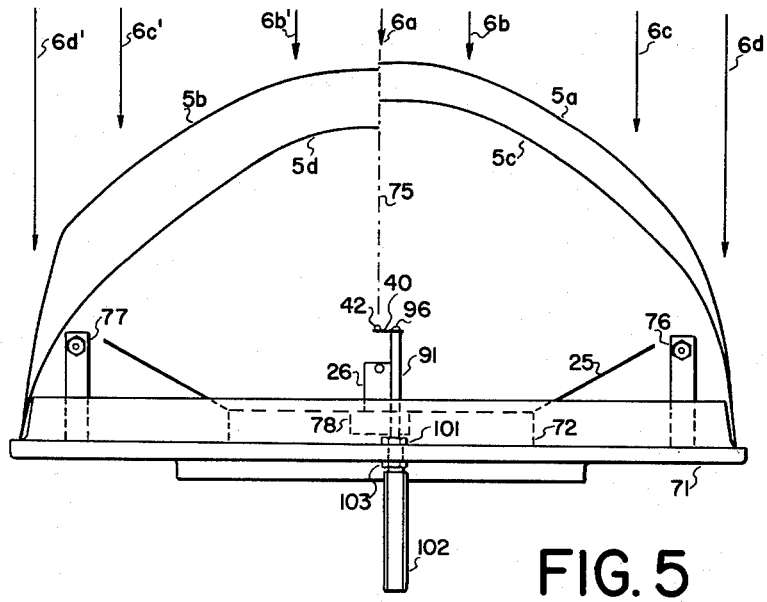
FIG. 5 is an end view, in reduced scale, of one form of antenna assembly and one half each of four end sectional views of the interior contour of the radome.

The broken line box 49 represents an antenna assembly which may be employed for transmitting a radio signal in a confined beam and for receiving a radio signal, which may be a reflected part of the transmitted signal which may be similar to the antenna assembly illustrated in FIGS. 2, 5 and 6 and may be the type of antenna assembly used as part of a detector device illustrated in FIG. 1 and labeled 20, or box 49 may represent an antenna assembly similar to that illustrated in FIGS. 7 and 8 and may be the type of antenna assembly used as part of a detector device illustrated in FIG. 1 and labeled 10.

The lead 50, extending between broken line block 49 and block 51 in FIG. 4, represents a coaxial R.F. transmission line which may electrically connect the antenna assembly, broken line box 49 with the ultra high frequency oscillator-detector, block 51.

The oscillator-detector of block 51 may be employed to generate the transmitted frequency and to mix the received frequency and the generated frequency in the cavity of the oscillator-detector and to detect any difference between the transmitted and the received signals and provide an output in the form of a beat frequency.

The difference frequency, or the beat frequency may appear as a change in grid current in the grid circuit of the oscillator-detector and such change in grid current may be applied, as an alternating current (A.C.) voltage, proportional to the beat frequency and applied to a low pass filter and coupling circuit, represented by block 52.

The A.C. voltage may be applied to a frequency selective feedback amplifier, block 53, which may amplify, through regenerative feedback, frequencies within a preselected bandpass, as determined by the value of the components of the frequency selective feedback amplifier network and may pass the amplified signal, via grid coupling and bias to a cathode follower, represented by block 54. The amplified signal is applied to another amplifier, represented by block 55, and is then applied to a rectifier, represented by block 56, which may be connected as a voltage doubler.

The circuitry that may be represented by the blocks 51 through 56 inclusive is fully illustrated in the said copyrighted publication, previously mentioned.

The rectified signal is applied through a coupling resistance to a threshold amplifier, and then to the coil of a relay, represented by block 57. Upon energization, the relay may close a pair of normally open contacts and provide a "detection pulse" via 58, for example to indicate the presence of a beat frequency, within a preselected band-pass of frequencies and above a given threshold value, has been generated in the oscillator-detector.

The electrical location of the coupling resistance, through which the amplified rectified signal is applied, and the manner by which the rectified signal is applied from the rectifier through the coupling resistance is substantially the same in the circuit of the said U.S. Patent 2,965,893 and in the circuit of the said radar detector described in the said copyrighted publication.

It will be obvious to those skilled in the art that a rectified signal may be applied through a coupling resistance to a threshold amplifier, such as described in the said U.S. patent and a similar rectified signal may likewise be applied through a coupling resistance to a multi-vibrator, such as described in the said copyrighted publication.

Thus the preferred form detector device, being a composite circuit as described, may provide a single "detection pulse" for each actuation which may indicate reception of a reflected signal, Doppler shifted in frequency, as produced by passage of an aircraft through the R.F. beam or may indicate reception of reflected transmitted signal amplitude modulated by the reflecting element, with both received signals above a predetermined amplitude.

The lead 50 in FIG. 4 may compare with the lead coaxial 50 in FIG. 2 or 6 which connects the antenna assembly electrically with the ultra-high frequency oscillator-detector, block 51.

FIG. 5 shows, in reduced scale form, the end view of one form of antenna assembly, including multiple views of sections of the contour of the interior of a radome, heater elements, reflector, dipoles, a modified supplemental dipole antenna assembly and mounting, which the antenna assembly in FIG. 2 represents without radome, heater elements and mounting may generally represent.

The mounting 71 is illustrated as a rectangular casting which supports other components of the antenna assembly. A supporting shoulder 72 mounted within mounting 71 is used to position the reflector 25 so that reflector 25 is raised above the base of the mounting. This provides room for a shielding 78 which may cover the R.F. transmission lines (not shown), extending from the dipoles.

Dipole 26 is alone illustrated, although it should be understood that dipoles 27, 28 and 29 are hidden from view by the dipole 26. A rod 91 is used to position the plate 40 which is secured to rod 91 by a screw 96. The plate 40 is employed to carry the printed circuit arms or wire arms of the modified dipole and a diode 42 which is illustrated on the top of the plate 40 in FIGS. 2 and 6. This is one general form of modified dipole antenna element, similar to that shown in FIGS. 2 and 6 while another form is more fully disclosed, in detail in FIG. 9.

Along each side of the reflector 25 are heater elements, the end of which are here shown as 76 and 77. These heater elements may be used, as desired, to prevent the formation of ice on the exterior of the contoured radome covering the antenna assembly.

Associated with the heater elements 76 and 77 may be a thermostat control (not shown) for automatically turning the heater elements on and off according to the temperature inside the radome.

Over the top of the antenna assembly in FIG. 5, extending from the shoulder of the mounting 71 to a center position, indicated by broken line 75, are four irregular arcuate lines. The broken line 75 indicates the center of the end view of the antenna assembly in FIG. 5. The irregular arcuate lines 5a and 5c extend from the right hand shoulder of mounting 71 to the center position above the antenna assembly and the lines 5b and 5d extend from the left hand shoulder of mounting 71 to the center position above the antenna assembly.

Each of the irregular arcuate lines 5a, 5b, 5c and 5d illustrate one-half of a full symmetrical section of the contour of the interior of a radome developed for the illustrated antenna assembly.

A mirror image of each of the irregular arcuate lines 5a, 5b, 5c and 5d respectively would illustrate the complete contour of the interior of the radome at a particular point on the radome, as indicated by the arrows 5a, 5b and 5b', 5c and 5c' and 5d and 5d' in FIG. 6.

FIG. 6 illustrates in reduced scale form a side view of the antenna assembly, mounting and radome illustrated in FIG. 5 except in FIG. 6 the heater elements have been omitted to provide a clearer view of the lower section of the contour of the radome interior and the several dipoles of the antenna assembly.

Referring to FIG. 5, although there is a thickness in the material of the radome itself, the contour of the half sections are illustrated without showing thickness since it is intended to show the contour of the interior of the radome rather than a cross-sectional view of the material content of the radome.

The line 5a illustrates one-half of the contour of the interior of a section of the radome across the width of the radome from the base on the right to the center, at the position indicated by the arrow 5a over the side view of the radome in FIG. 6.

The line 5b illustrates one-half of the contour of the interior of a section of the radome across the width of the radome from the base on the left to the center at the points indicated by arrow 5b on the left half of the side view and by arrow 5b' on the right half of the side view in FIG. 6.

It should be noted that an identical contour of the section of the interior of the radome illustrated by line 5b in FIG. 5, and the mirror image of line 5b, would appear at the point indicated by arrow 5b' in FIG. 6. It should be understood that the radome is symmetrical across its width from the center line 75 and is also symetrical along its length from its center line 75' in FIG. 6 so that with the exception of the contour of the center section at 5a, in FIG. 6, the lines 5b, 5c and 5d and their respective mirror images represent the full contour of the interior of sections of the radome at points on both sides of the center line 75' in FIG. 6, as indicated by arrows 5b and 5b', 5c and 5c' and 5d and 5d' respectively.

The line 5c in FIG. 5 extending from the right side of the base of the mounting 71 to the center 75 illustrates the right hand half of the contour of the interior of a section of the radome across the width at the points indicated by the arrows 5c and 5c' in FIG. 6. The mirror image of the line 5c in FIG. 5 would illustrate the contour of the left hand half of the contour of the radome.

The line 5d in FIG. 5 extending from the left hand side of the base of the mounting 71 to the center 75 illustrates the left hand half of the contour of the interior of a section of the radome across the width at the points indicated by the arrows 5d and 5d' in FIG. 6.

Alternate halves of the sections of the contour of the interior of the radome have been illustrated because of the irregularity of the contour of the radome at various positions. As for example a mirror image of the line illustrating the contour at 5b will show that certain parts of the full contour line will cross over the line 5a, illustrating the contour of the radome at another point of the radome.

FIG. 6 is a reduced scale view of the side of the antenna assembly illustrated in FIG. 5 and illustrating one half of each of four symmetrical sections of the contour of the interior of the side view of the radome. For convenience the heater elements have been eliminated from this side view.

The antenna assembly is illustrated mounted on mounting 71 with reflector plate 25 mounted on the shoulder mountings 72 and 73 which extend along each end of the mounting. This provides space for the shielding 78 over the transmission leads carrying the R.F. to and from the dipoles 26, 27, 28 and 29 with the coaxial lead 50, extending from the shielding 78, illustrated as terminating at a coupling 79. The rod 91 of the modified supplemental antenna is mounted on the mounting 71 by means of the fitted shoulder 101 and the nut 103 with an adjustable slide 102 also illustrated and more fully described below.

For convenience the dipole 43–44 is here illustrated as wires (a printed circuit form could not be illustrated in such view) joined via connection to opposite sides of diode 42 and held on a plate 40. The plate 40 is mounted on the rod 91 by means of screw 96.

The leads (47 and 48 of FIG. 3) which would connect to the modified dipole and supply the A.C. for modulating the reflection characteristic of the modified supplemental dipole antenna are not illustrated although it is to be understood that wire leads would be connected to the arms 43 and 44 so that the A.C. could be applied to the antenna and that such wires (47 and 48) would connect the supplemental antenna dipole to the remainder of the circuit for providing the A.C. The remaining circuitry for providing the A.C. or modulated or pulsing D.C. may be similar to the schematic circuitry shown in FIG. 3.

The broken line 75' represents the center of the lengthwise section of the radome the contour of which is illustrated in four half sectional views 6a, 6b, 6c and 6d. Each sectional view is half of a full section that is symmetrical and its respective mirror image will illustrate the half of the sectional view not shown and when combined with the half section that is illustrated will represent the contour of an entire section of the radome at the respective place indicated over the radome in FIG. 5 and labeled 6a, 6b and 6b', 6c and 6c' and 6d and 6d'.

The line 6a in FIG. 6 extending from the right hand shoulder of mounting 71 to the center line 75' illustrates the right hand half of the contour of the interior of the radome at the center of the width of the radome indicated by arrow 6a in FIG. 5.

The line 6b extending from the left hand shoulder of mounting 71 to the center line 75' illustrates the left hand half of the contour of the interior of the radome at the sections indicated by arrows 6b and 6b' in FIG. 5. The line 6c extending from the right hand shoulder of mounting 71 to the center line 75' illustrates the right hand half of the contour of the interior of the radome at the sections indicated by arrows 6c and 6c' in FIG. 5 and the line 6d illustrates the left hand half of the contour of the interior of the radome at the sections indicated by arrows 6d and 6d'.

Although the interior of a radome may conform to the contour of a minimum voltage surface of the projected beam, the interior surface of the radome itself may not, due to manufacturing tolerances, be at the exact minimum voltage surface (i.e., may parallel the minimum voltage surface rather than fall on the said surface. Under such conditions slight adjustment of the position of the minimum voltage surface of the projected beam may be made by means of an ordinary "line stretcher" which may be placed in, and become part of the transmission line (50 in FIGS. 2 and 4, for example) between the antenna assembly and the oscillator-detector. A "line stretcher," which is well known in the art, may be employed to adjust the phase of the wave radiated from the multiple dipole antenna assembly and thus adjust the position of the minimum voltage surface of the beam so that such minimum voltage surface and the interior surface of the radome may be substantially the same surface.

After adjustment of the position of the minimum voltage surface is made, relative to the interior surface of the radome, adjustment of the position of the modified supplemental dipole antenna may be made relative to a maximum voltage point of the projected wave energy. Positioning of the modified supplemental dipole antenna may be made, as more fully described below, through rotating the rod 91 and/or by raising and lowering the rod 91 through its mounting hole.

The preferred position of the supplemental dipole antenna is at a location within the projected beam where projection of the beam itself is substantially uneffected and where, in the beam, the supplemental dipole antenna may substantially be at a maximum voltage point of the projected wave energy.

With the supplemental dipole antenna so positioned, adjustment of the potentiometer 46 (FIG. 3) may be made so that the amplitude of modulating current provides a modulated reflected signal of sufficient amplitude to obtain response by the detector device when the modulating current is applied across the modified supplemental dipole antenna. Thus a minimum amplitude "test signal" may be provided so that not only overall operation of the detector device may be tested but decay of the transmitted signal, from a predetermined desired maximum value may also be remotely determined.

FIG. 7 is a reduced scale top view of another form of antenna assembly in which two rows of dipoles are arranged on a flat reflector 80. The dipoles 81 through 88 are of the conventional type, generally used for transmission and reception of ultra-high frequency radio energy. The reflector 80 also supports the rod 91 of a modified supplemental antenna element, 90, here illustrated in another form, which is shown in a detail view in FIG. 9. The reflector 80 may be mounted in a manner similar to the antenna assembly of FIGS. 5 and 6 or may have another type of mounting which may serve as the antenna assembly on a detector device, such as illustrated in FIG. 1 and labeled 10, with a contoured radome over the antenna, the interior of which may conform to a minimum voltage surface of the projected beam.

FIG. 8 is a side view of the antenna assembly illustrated in FIG. 7 with the reflector 80 and dipoles 84 and 88 shown with the other dipoles arranged behind the illustrated dipoles. A rod 91 of the supplemental antenna is illustrated extending above the dipoles 88 and 84. A shield 89 is also illustrated to provide covering for the transmission leads carrying the ultra-high frequency radio energy. This shield may connect to a coaxial lead such as 50 in FIGS. 2 and 4, for example.

Figure 9:
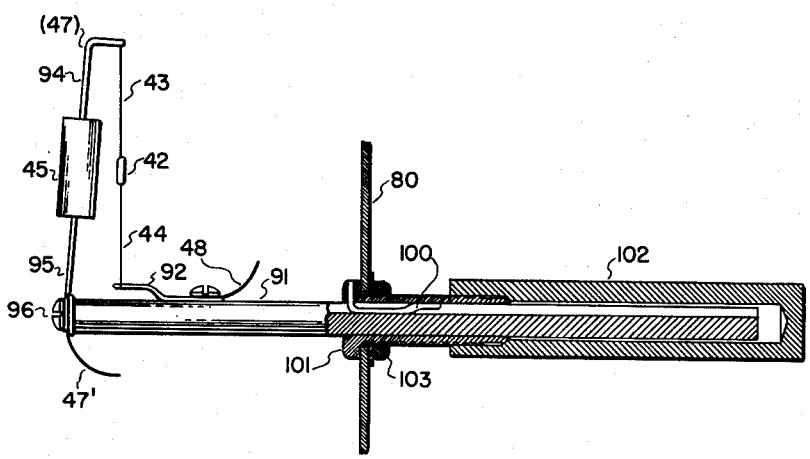

FIG. 9 illustrates, in full scale detailed form, another form of modified supplemental antenna that may be used for test purposes with the antenna assembly illustrated in FIGS. 7 and 8, for example. The modified supplemental dipole antenna illustrated in FIG. 9 is presented in the same attitude as the supplemental antenna in FIG. 8 except that the antenna in FIG. 9 is rotated 90 degrees so that the resistor, diode and modified dipole may be seen.

It will be noticed that the diode, arms and resistor of the modified supplemental antenna in FIG. 9 have the same number as comparable parts in FIGS. 2, 3, 5 and 6. It should be noted that although no resistor is illustrated with the modified supplemental antenna in FIGS. 2, 5 and 6 the resistor is a part of the circuit that is not there illustrated.

Further it will be noted that the modified supplemental dipole antenna supported on plate 40 in FIG. 2 has been replaced in FIG. 9 by the suspended modified supplemental dipole antenna including dipole 43–44 and the diode 42. One end of arm 44 is illustrated connected to a lug 92, which may be used to connect arm 44 to lead 48. One end of arm 43 is connected to heavy wire 94 (which may compare electrically with lead 47 in FIG. 3) which is part of a supporting "arm" including heavy wire 95, resistor 45 and wire 94. The one end of wire 95 is held to the rod 91 by means of a screw 96, the wire 95 being properly insulated from both the screw 96 and the rod 91. The lead 47' may compare electrically with the lead 47' in FIG. 3.

The rod 91 is shown partly in sectional form to show how the height of the modified supplemental antenna may be adjusted. It should be understood that the other form antenna, as shown in FIG. 2, may be substituted for the form shown in FIG. 9 by removing the screw 96 at the top of rod 91 and removing the lug 92 from the rod 91 so as to remove the wires 95 and 94 and resistor 45 and the arms 43 and 44 and the diode 42 and affix the plate 40, with the arms 43 and 44 and diode 42 on plate 40, on to the rod 91 with screw 96.

Thus it will be seen that either form of modified supplemental dipole antenna may be supported by the rod 91.

For convenience of illustration the remaining circuitry, more fully represented in FIG. 3, for providing the applied A.C. across the diode and the modified dipole of FIG. 9, has been omitted but it is to be understood that an A.C. would be so applied to this assembly by circuitry similar to that represented in FIG. 3 when operated, for test purposes.

The rod 91 is slotted, as seen in sectional form, so that a spring, 100 which is anchored in the hole of a fitted shoulder 101, may be used to hold the rod 91 from rotating after being manually adjusted. The sleeve 102 is tapered at its open end and the fitted shoulder is slotted at the end over which the sleeve fits so that the sleeve 102 may be pushed up toward the reflector plate 80 and press the slotted ends of the fitted shoulder together, to further hold the rod 91 in vertical position after being manually adjusted so as to have the dipole in a maximum voltage portion of the transmitted wave.

The exterior of the fitted shoulder is threaded so that a nut 103 may be used to tighten and hold the shoulder 101 in position.

Thus the rod 91 may be held in position as adjusted and may be easily and quickly adjusted to a new position by loosening the sleeve 102 and the nut 103 so that the fitted shoulder 101 and rod 91 may be easily rotated and the rod 91 may be moved upor down, relative to the reflector 80, as desired.

Thus, one form of the contoured radome has been illustrated and multiple forms of a modified supplemental dipole antenna elements have been illustrated and described as well as multiple forms of the detector device itself.

Such detector devices may be employed to provide a detection pulse in response to passage of an aircraft through a projected beam. Such detection pulse may be applied to a relay assembly to operate a detector relay, the relay assembly being part of an airport traffic surveillance system or aircraft tracking system, such detection pulse may be used to operate an indicator in an indicating system.

While alternate forms of the invention have been described and illustrated, it will be appreciated by those skilled in the art that various other modifications and substitution of components may be made without departing from the invention as defined by the objects and claims.

I claim:

1. In a detection apparatus having a high frequency transmitting and receiving antenna and an associated oscillator-detector circuit for transmitting high frequency radio signals in a confined beam and for receiving a Doppler modified signal reflected from a moving body passing through said beam and mixing said transmitted and said received signals in said oscillator-detector to provide a low frequency Doppler beat frequenicy and a low frequency signal output corresponding to said Doppler beat frequency; an auxiliary antenna adjacent the first mentioned antenna for providing reflection of part of said high frequency radio signals to said first mentioned antenna, and means for applying a low frequency signal to said auxiliary antenna for varying the reflection characteristic of said auxiliary antenna at the frequency of the applied said low frequency signal for providing an amplitude modulated reflected signal to said first mentioned antenna to provide a low frequency component in the said oscillator-detector circuit comparable to a Doppler beat frequency for test purposes.

2. A combination as in claim 1 and including means for remotely controlling when the said low freqüency signal may be so applied to the said auxiliary antenna.

3. A combination as in claim 1 and including means for adjusting the amplitude of said low frequency applied signal so as to adjust the amplitude of modulation of the said reflection characteristic of said auxiliary antenna.

4. A combination as in claim 1 and in which said applied low frequency signal is a pulsating current.

5. A combination as in claim 1 in which said auxiliary antenna includes a dipole.

6. A combination as in claim 1 in which said auxiliary antenna includes a dipole comprising two wires as arms of the dipole and a diode connecting said two wires.

7. A combination as in claim 1 in which said auxiliary antenna includes a dipole comprising two wires as arms of the dipole and a diode connecting said two wires and in which a resistance is in series with said dipole and diode and the applied low frequency signal.

8. A combination as in claim 1 in which said auxiliary antenna includes a dipole comprising two wires as arms of the dipole and a diode connecting said two wires and in which a resistor and its connecting leads serve to support said diode and said wires for said dipole with said resistor connected in series with said dipole and the applied low frequency signal.

9. In a system for monitoring aircraft traffic proceeding along a path, a plurality of detectors, spaced along said path for detection of aircraft, a remote indicator panel assembly including indicators individual to the respective detectors to be operated thereby, each said detector including a high frequency transmitting and receiving main antenna and associated oscillator-detector means for generating the transmitted frequency and for mixing the generated and any received high frequencies and for providing an output corresponding to a beat frequency developed in said oscillator-detector, corresponding to the difference frequency between the transmitted frequency and the received frequency, a supplemental antenna mounted in close proximity to said main antenna for reflecting to said main antenna a part of said transmitted frequency, means for applying when desired a modulating current to said supplemental antenna to modulate its reflection of said part of said transmitted frequency at a frequency typical of said beat frequency, whereby upon application of said modulating current a corresponding modulation component will appear in said oscillator-detector to cause said detector to respond to said modulation to operate its associated remote indicator when said detector is transmitting and receiving signals and responding to beat frequency properly.

10. A combination as in claim 9, and in which said means for applying a modulating current to said auxiliary antenna includes remote control means at said remote panel for controlling said application of modulation current.

11. A combination as in claim 10, and in which said remote control means includes means for causing said application of modulating current in a plurality of said detectors.

12. In a detection device for detecting a moving body traveling on the ground or in the air by reflection of radio micro-wave from said body, main antenna means for transmitting and receiving micro-wave energy, supplemental antenna means for reflecting part of said micro-wave energy, means for generating said micro-wave energy for said main antenna means, means for mixing said generated micro-wave energy and received micro-wave energy and providing a beat frequency when said generated and said received wave energies differ in frequency, means responsive to said beat frequency for providing an output pulse when said beat frequency exceeds a predetermined amplitude and is within a predetermined band-pass of frequencies, means for modulating the reflection characteristic of said supplemental antenna at a frequency within said band-pass when desired, so that part of the micro-wave energy transmitted from said main antenna means will be reflected from said supplemental antenna means with the said reflected micro-wave energy modulated in amplitude and at a frequency so that a frequency component within said band-pass will be developed in said mixing means for mixing to which said responsive means will respond.

13. In a detection device for detecting passage of vehicles traveling on the ground and traveling in the air, means for transmitting and receiving micro-wave energy including receiving micro-wave energy reflected by any of said vehicles, means for generating said micro-wave energy and mixing the said transmitted and received micro-wave energies so as to provide a beat frequency corresponding to the frequency difference between the transmitted and receiving micro-wave energies, means for providing an output from said generating and mixing means, said output having a frequency corresponding to said beat frequency developed by such mixing, filter means and amplifying means for filtering and amplifying said output from said generating and mixing means, means for rectifying the said output, and means responsive to said rectified output to provide a detection pulse, and further including means for reflecting part of the said transmitted micro-wave energy back to said receiving means, remote controlled means for modulating the reflection characteristic of said reflecting means at a frequency corresponding to the beat frequency obtained from passage of a vehicle so as to provide an amplitude modulated reflected signal for artificially inducing a frequency component corresponding to the frequency of modulation of said reflection characteristic of said means for reflecting for testing said detection device when desired.

14. In a detection apparatus for detecting moving vehicles within a desired range, an antenna assembly including multiple dipoles and reflector combining to provide a confined beam of wave energy for transmitting high frequency radio wave energy and for receiving radio wave energy, an oscillator-detector for generating radio wave energy for transmission and for mixing said generated wave energy and received wave energy and for developing a Doppler beat frequency when the generated radio wave energy and the received radio wave energy differ from each other, as by virtue of Doppler frequency shift in wave energy reflected from a moving vehicle, a supplemental dipole antenna in close proximity to at least one dipole of said multiple dipoles and positioned within the said confined beam so as to reflect part of the said transmitted radio wave energy to one or more said multiple diodes, means for modulating the reflection characteristic of said supplemental dipole antenna at a low frequency, when desired, so that the transmitted radio wave energy reflected by said supplemental antenna may be modulated at a frequency corresponding to the frequency of modulation of the said reflection characteristic so as to provide development of a corresponding frequency component in the said oscillator-detector, and a radome covering said multiple dipoles and supplemental dipole and the interior of said radome generally conforming to a surface generally spaced an identical small number of half wave lengths of the said confined beam so as to reduce reflection of the said confined beam from the interior of the radome to a minimum standing wave value.

15. In a combination a detection apparatus including an antenna assembly for transmitting and receiving high frequency radio waves, an oscillator-detector for generating the transmitted high frequency radio waves and for developing a difference frequency corresponding to the difference between the transmitted waves and any received reflected waves, a supplemental antenna for reflecting a small part of the transmitted radio waves with a reflection characteristic so that there is normally substantially no time variation of amplitude of waves reflected from said supplemental antenna, means for modulating said reflection characteristic of said supplemental antenna at a desired frequency when it is desired to test the operation of the apparatus, so that there is a cycle variation in amplitude in the last named reflected waves when said reflection characteristic is so modulated and said transmitted and received waves in said oscillator-detector will develop a frequency component corresponding to the modulated reflected wave for determining whether or no the detection apparatus is operating.

16. In a system for detecting moving objects by the Doppler frequency shift between transmitted micro-wave energy and received micro-wave energy reflected from the moving object, a primary antenna system for transmission and reception of said micro-waves, means for generating said micro-waves for said transmission and for mixing generated waves with said received reflected waves to derive a low frequency Doppler beat frequency therefrom, means for providing an output in response to a predetermined band of said low beat frequency, and means for introducing as desired into said antenna system reflected micro-wave energy modulated at a low frequency within said band for simulation of a Doppler beat frequency for test of said transmission and reception and response.

17. A combination as in claim 16 and in which said means for introducing low frequency modulation includes a supplemental dipole antenna adjacent the main antenna for reflecting a small amount of said transmitted waves to said main antenna, and a modulating circuit connection to a source of low frequency alternating current to apply rectified pulsating current to said supple- including a rectifier and a resistance and switch means for mental antenna for modulatnig its reflection of said transmitted waves.

18. In a Doppler radio reflection system for detecting aircraft moving along a path of travel by the transmission of ultra-high frequency radio waves transverse to said path and the reception of such waves as reflected from a moving aircraft and mixing of said waves to derive a low frequency Doppler beat signal, an antenna assembly for transmission and reception of said ultra-high frequecy waves and including at least one row of dipoles arranged in collinear broadside array along a line substantially parallel to said path and a reflector unit cooperating with said dipoles, for concentrating said transmission and reception substantially to a desired beam transmerse to said path and extending somewhat along said path, and a radome covering said dipoles and reflecting unit and having an elongated tapered shape resembling a bread-loaf and whose contour presents a surface approximating a constant small whole number of half-wave lengths for said ultra-high frequency waves from said dipoles and reflector unit for minimizing response to any moisture and water drops moving on the outer surface of the radome.

19. In a Doppler radio reflection detection system for aircraft in flight along a path of travel, an antenna assembly for transmission and reception of ultra-high frequency radio waves including a row of dipoles arranged in collinear broadside array along a line substantially parallel to said path, a reflecting unit for cooperating with said dipoles to concentrate said transmission and reception substantially to a desired beam and comprising a reflecting base plate elongated along the line of said row of dipoles and a pair of reflecting wing plates extending outward and upward at a low angle from the elongated sides of the base plate, and a radome covering said dipoles and reflecting unit and having an elongated tapered shape resembling a bread-loaf and whose contour presents a surface approximating at substantially all points over the dipoles and reflector a constant whole number of half wave lengths for the ultra high frequency waves to provide a minimum response to moisture and water drops running along the outer surface of the radome.

References Cited in the file of this patent
UNITED STATES PATENTS
2,510,299    Schramm _____ June 6, 1950